(12) United States Patent
Leitch

(10) Patent No.: US 6,473,469 B1
(45) Date of Patent: Oct. 29, 2002

(54) LOCAL COMMUNICATION SYSTEM AND APPARATUS FOR USE THEREIN

(75) Inventor: James R. Leitch, Surrey (GB)

(73) Assignee: Communication & Control Electronics Limited, Surrey (GB)

(*) Notice: Subject to any disclaimer, the term of this patent is extended or adjusted under 35 U.S.C. 154(b) by 0 days.

(21) Appl. No.: 09/294,088

(22) Filed: Apr. 19, 1999

Related U.S. Application Data

(63) Continuation of application No. PCT/GB98/02507, filed on Aug. 20, 1998.

(30) Foreign Application Priority Data

Aug. 21, 1997 (GB) ............................................. 9717613

(51) Int. Cl.⁷ ............................ H04L 27/20; H04B 1/38
(52) U.S. Cl. ...................... 375/308; 375/219; 375/279; 375/282
(58) Field of Search ............................... 375/219, 220, 375/241, 242, 257, 279, 282, 308, 328, 333, 361

(56) References Cited

U.S. PATENT DOCUMENTS

| | | | | |
|---|---|---|---|---|
| 3,157,740 A | | 11/1964 | Crafts ......................... | 375/280 |
| 4,213,094 A | | 7/1980 | Wood .......................... | 370/215 |
| 4,216,177 A | | 8/1980 | Otto ............................ | 264/415 |
| 5,418,819 A | * | 5/1995 | Hamada et al. ............. | 375/279 |
| 5,553,064 A | * | 9/1996 | Paff et al. ................... | 370/478 |
| 5,559,828 A | * | 9/1996 | Armstrong et al. ......... | 375/130 |
| 5,585,761 A | | 12/1996 | Lamberg et al. ............ | 329/304 |
| 5,600,678 A | * | 2/1997 | Petranovich et al. ....... | 375/298 |
| 5,838,797 A | * | 11/1998 | Iwasaki et al. ............. | 380/270 |
| 5,852,636 A | * | 12/1998 | Mathieu et al. ............. | 375/272 |
| 5,864,585 A | * | 1/1999 | Erismen ...................... | 375/272 |
| 5,903,609 A | * | 5/1999 | Kool et al. .................. | 375/261 |
| 5,970,046 A | * | 10/1999 | Takegahara et al. ........ | 370/203 |
| 5,982,810 A | * | 11/1999 | Nishimori ................... | 375/150 |
| 6,018,551 A | * | 1/2000 | Tanaka et al. .............. | 375/326 |
| 6,144,712 A | * | 11/2000 | Samueli et al. ............. | 375/371 |
| 6,304,611 B1 | * | 10/2001 | Miyashita et al. .......... | 375/260 |

FOREIGN PATENT DOCUMENTS

| | | |
|---|---|---|
| EP | 0 517 533 A | 9/1992 |
| EP | 0517533 A2 | 12/1992 |

OTHER PUBLICATIONS

Product Datasheet 4009/DS/0.7 (Preliminary Data) CONAN, ECI8001. Electrical CONAN® transceiver, Jan. 25, 1998

"The Art of Electronics", Second Edition, published 1989, by Paul Horowitz & Winfield Hill, pp. 141–143 ©Cambridge University Press, 1980, 1989.

Com20023, Advance Information, SMC Standard Microsystems Corporation, CARNET, 1995.

* cited by examiner

Primary Examiner—Young T. Tse
(74) Attorney, Agent, or Firm—Nixon & Vanderhye P.C.

(57) ABSTRACT

A local area network is based on a ring of twisted pair cable links (UTP), each carrying at least 1.4 Mbps gross data rate. Each station on the network includes an encoder and a following station includes a decoder for PSK (phase shift keying) modulated serial data. The encoder uses an analog sine wave oscillator and inverter for generating antiphase analog sine wave signals at a carrier frequency and a switching circuit for selecting between the carrier signals according to the data signal to be transmitted. The decoder may use a simple integrator and comparator arrangement. The encoder and decoder may be provided in the form of an adapter circuit, such that a network based on optical fibre can be replaced by a network based on twisted pair cable using the same digital circuits. Generation of the PSK waveform by analog circuitry rather than digital synthesis reduces radio frequency emissions to a level suitable for use in an automotive audio/video communications network.

35 Claims, 9 Drawing Sheets

US 6,473,469 B1

LOCAL COMMUNICATION SYSTEM AND APPARATUS FOR USE THEREIN

This application is a continuation of PCT/GB98/02507 filed Aug. 20, 1998.

BACKGROUND OF THE INVENTION

1. Field of the Invention

The invention relates to a local communication system for digital serial data and various apparatus for use as transmitting and/or stations of such a network. The invention has many applications but is particularly intended to provide a low cost network for the integrated distribution of digital audio signals or other, high-volume "source data", together with control messages, in vehicles.

2. Related Art

A local communication system which combines source data (CD audio, MPEG video, telephone audio, navigation data etc) with control commands in a low cost optical fibre network is available in the form of the D2B Optical system. For details, see for example the "Conan Technology Brochure" and the "Conan IC Data Sheet" available from Communication & Control Electronics Limited, Stirling House, Stirling Road, The Surrey Research Park, Guildford, Surrey GU2 5RF, United Kingdom (http://www.candc.co.uk). See also German patent applications of Becker GmbH, Karlsbad, Germany with filing numbers 19503206.3 (95P03), 19503207.1 (95P04), 19503209.8 (95P05), 19503210.1 (95P06), 19503212.8 (95P07), 19503213.6 (95P08), 19503214.4 (95P09) and 19503215.2 (95P 10). "Conan" is a registered trade mark of Communication & Control Electronics Limited. The gross data rate in the D2B Optical system is 5.64 megabits per second (Mbps) (for an audio sampling rate of 44.1 kHz). Each segment of the network can carry 4.2 Mbps "source data" (for example three "CD quality" stereo audio channels of 1.4 Mbps each), together with control messages at a gross rate of about 176 kbps.

Although low cost fibre and electro-optical components can be used in the D2B Optical system, nevertheless the cost of these is a significant part of the cost of the network, and the range of commercially viable applications could in principle be widened by adopting, for example, a simple wire cable, if problems of susceptibility to and generation of spurious electromagnetic radiation and noise signals (EMI) could be eliminated.

Another proposal for an in-car network is CARNET, using a chip COM20023 available from Standard Microsystems Corporation, Hauppauge, N.Y. (see http://www.smc.com). CARNET uses ARCNET network protocols (ANSI Standard 878.1), with additional frequency shift keyed (FSK) encoding, which may be intended to permit wired networks with low EMI noise emission. The data rate with FSK is 5 Mbps, comparable to D2B Optical. The CARNET chip also provides an interface to CD-ROM for accessing navigation databases, and this is said to be suitable for any standard audio datastreams also.

However, the CARNET chip generates the FSK waveform by digital synthesis, imposing high frequency quantisation noise on the desired band-limited signal. In practice, this noise includes components in the FM radio frequency band (87–108 MHz), and filtering to suppress this adequately in an in-car audio system is difficult and expensive. The COM20023 data sheet proposes a low pass filter including an inductor, but with no indication of the cost or efficiency of this solution in terms of FM radio interference.

Also, since the digital to analogue converter (DAC) for the FSK waveform is external to the CARNET chip, radiation of high frequency components will inevitably occur from the DAC and circuit wiring before the filter.

FSK can be regarded as a binary version of frequency modulation (see J Dunlop and D G Smith, "Telecommunications Engineering" (Second Edition), Chapman and Hall, 1989, ISBN 0-412381907). Two carrier waveforms of different frequencies are defined and switched between, depending on the data bit values. A further form of modulation offering a more confined spectrum than FSK is phase shift keying (PSK), known and used in modems for lower-rate data communications via voice channels. In PSK different phase components at a single carrier frequency are selectively switched between, depending on the data bits.

In a standard 9600 bps modem, however, the basic binary PSK scheme is elaborated so that quadrature phase modulation and amplitude modulation are combined with a baud rate (symbol rate) of 2400 baud, to achieve a data rate of four bits/baud.

Such techniques require complex adaptive equalisation and coherent decoder circuits, however, and other media such as optical fibre or coaxial cable are conventionally used for wide band local area networks of the type presently desired.

SUMMARY OF THE INVENTION

The invention provides an alternative form of network based on analogue PSK modulation circuitry, and novel circuits for transmitting and receiving digital data by PSK modulation, as defined in the appended claims. The invention provides in effect a high frequency modem having very low noise emissions, compared with comparable known designs.

In one embodiment, the PSK encoding and decoding can be implemented by a small adaptor circuit connected between a digital communication interface (for example the CONAN IC) and its timing crystal. Such an interface might for example be a Conan IC implementing D2B Optical protocols, an ARCNET interface, or some other interface.

A novel PSK decoder forming part of the high frequency modem comprises a simple integrator circuit (low pass filter), followed for example by a comparator.

DETAILED DESCRIPTION OF EXEMPLARY EMBODIMENTS

Figure 1:
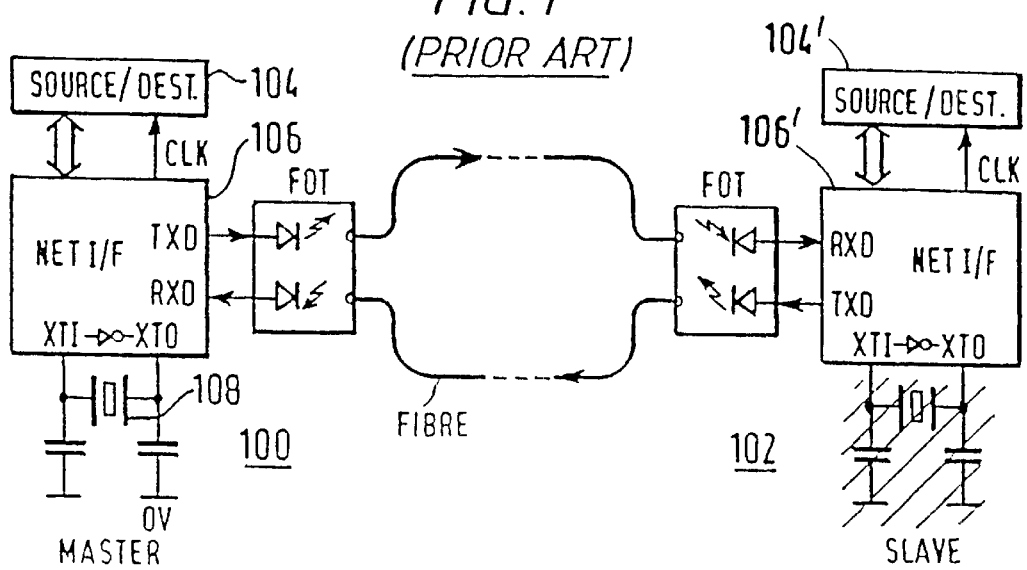
FIG. 1 shows schematically a known local communication system for digital audio/video data, based on optical fibre.

FIG. 1 shows two representative stations 100 and 102 forming part of a local area network such as the D2B Optical (CONAN) network mentioned above. The network medium is an optical fibre ring, comprising a number of individual point-to-point links. Each station comprises a low-cost fibre optic transceiver FT, containing an LED for light transmission and a phototransistor or photodiode for light reception. The photodiode receives the light from the LED of a previous station in the ring.

The application area in the present embodiment is that of in-car audio systems. A typical system may comprise a CD changer, audio and video tuners, a cassette player, audio amplifiers, a telephone and a control/display head unit, all communicating via the ring network. Each station therefore comprises for the most part the means 104 appropriate for its role as a source and/or destination of digital audio/video information and control messages. To connect the source/destination means 104, 104' to the network, each station includes a network interface circuit 106, 106' which drives the LED of the FOT with a channel encoded digital signal TXD, and which receives an electrical signal RXD representing in electrical form the optical signal received from the previous station in the ring.

In the D2B Optical system, one station in the network is designated the "master", in this case station 100. The interface circuit 106, 106' of the master station is connected to a resonant element (108) such as a crystal and generates by this means clock signals which are used by the interface circuit to define the network timing. Because the D2B Optical network timings are synchronised with the sources and destinations of audio data, these same clock signals also define the timing of the digital audio signal processing within the source/destination means 104, 104'. In an alternative arrangement, the crystal can be contained within the source/destination means 104, 104' itself, and the clock signal for the interface circuit 106, 106' provided by means 104,104'.

The slave station 102, on the other hand, derives its clock signal from the optical signal received via the network from the previous station (ultimately, the last station). This clock signal is used for all processing within the interface circuit and can also be used for processing of the audio data received. As shown hatched in FIG. 1, a crystal may be provided for use in start-up and fault conditions, when the slave station is not yet synchronised with the master station.

The optical fibre system of FIG. 1 is highly immune to electrical noise common in automotive environments, and also radiates relatively little electromagnetic interference of its own, although the fibre is a low-cost, multi-mode plastic fibre and the FOT components are relatively cheap, the fibre components are still more expensive than a simple wired connection. Also, it is believed that the thermal noise and high gain in the photodetector of the FOT units introduces jitter in the detection of the network signals, which has an adverse influence on processing reliability and sound quality throughout the system. In particular, in the ring network such as that illustrated, this jitter can accumulate undesirably at successive stations.

Figure 2:
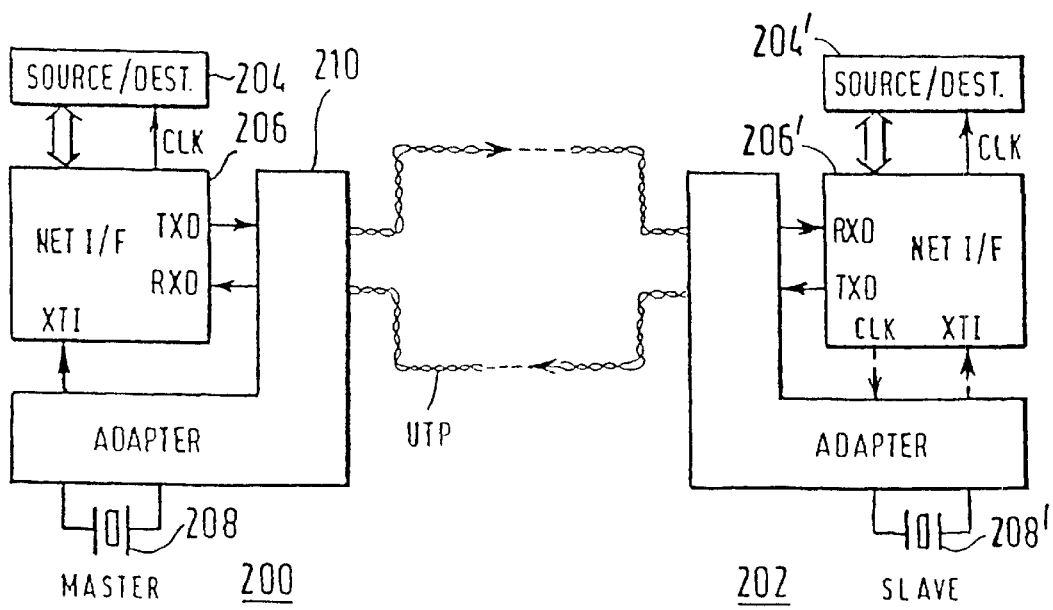
FIG. 2 illustrates adaptation of the system of FIG. 1 to obtain a network based on twisted pair cable.

FIG. 2 shows the novel network, in which the optical fibre is replaced by an unshielded twisted pair (UTP) cable, and the FOT units are omitted. Since the raw data signals TXD have large voltage swings and sharp transitions, however, noise emissions and noise immunity would not be satisfactory if these were imposed directly on the electrical network. Therefore, in each station an adapter circuit 210 is provided, which modulates the data in a form of phase shift keying (PSK), to be described in more detail later. The adapter circuit is shown to illustrate that it can be applied to the existing interface circuit 106/206, 106'/206' which may for example be a OCC8001 "CONAN" chip mentioned above. Of course, it may be preferred to integrate some or all of the PSK adapter circuit 210 in one chip with any of the digital circuitry of the interface circuit and/or the source/destination means 204.

The crystal arrangement 208 in FIG. 2 is connected not to the network interface or the source/destination means 104, 204', but to the adapter circuit 210. The clock signal CLK for a digital interface circuit 106, 206' and source/destination means 204,204' is provided by the adapter.

Figure 3:
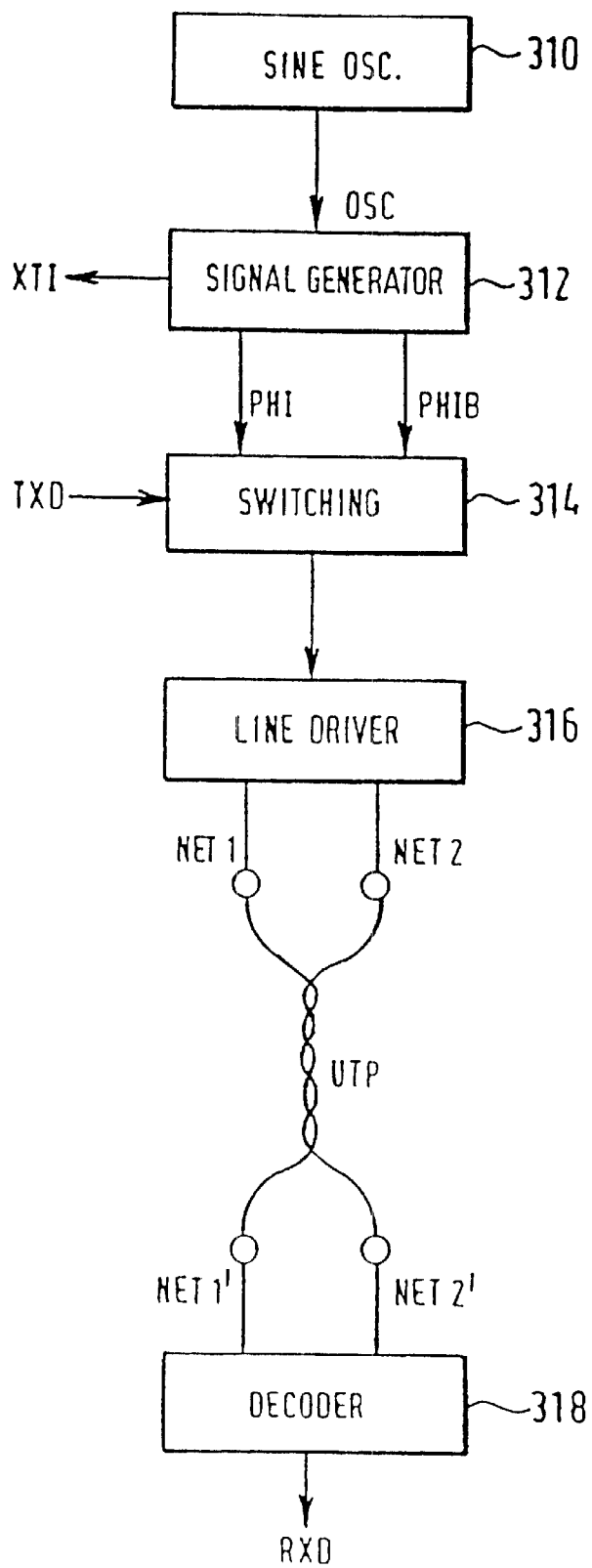
FIG. 3 shows in block schematic form transmitting and receiving circuits of two stations in the system of FIG. 2.

FIG. 3 shows the main components of the adapter unit 210. Each adapter in the ring network of FIG. 2 has encoder and decoder sections. For ease of description, FIG. 3 actually shows the encoder section of one station (the master) above the UTP link, and the decoder section of the following station below the UTP link. The encoder section contains the crystal (208 in FIG. 2) connected as part of a sine wave oscillator 310. A sine wave signal OSC of predetermined frequency is supplied to a signal generator circuit 312. This provides a square wave clock signal XTI for the clock input of the digital system (interface circuit 206 in FIG. 2). Signal generator 312 also provide two antiphase sine wave signals PHI and PHIB, which will be used to synthesise the PSK waveform.

A switching unit 314 receives a digital data signal TXD to be transmitted, and produces a modulated signal MOD by switching between the waveforms PHI and PHIB depending on the value of the digital signal TXD. A differential line driver 316 converts the signal MOD into a balanced signal on output lines NET1 and NET2. These are connected by a simple connector to the beginning of the twisted pair link UTP. If necessary, a filter can be connected before and/or after the line driver to reduce emissions.

When the signals NET1 and NET2 are applied to the conductors of the twisted pair cable, the PSK modulated signal is carried to the far end of the cable. Because of the band-limited properties of PSK modulation and the differential (balanced) nature of the signals, however, radiation from the cable is minimised. The differential driving also means that noise induced in the cable from outside can be cancelled in the decoder. This is very important in the automotive applications where, besides the engine ignition system, mobile telephone transmitters may be operating as part of the network or in close proximity.

At the decoder side the received signals which shall be referenced NET1' and NET2', are applied to a decoder circuit 318, which outputs a received data signal RXD reproducing the transmitted signal TXD. In this way, the adapter is simply substituted for the fibre optic transceiver (FOT) units of the optical network.

Figure 4:
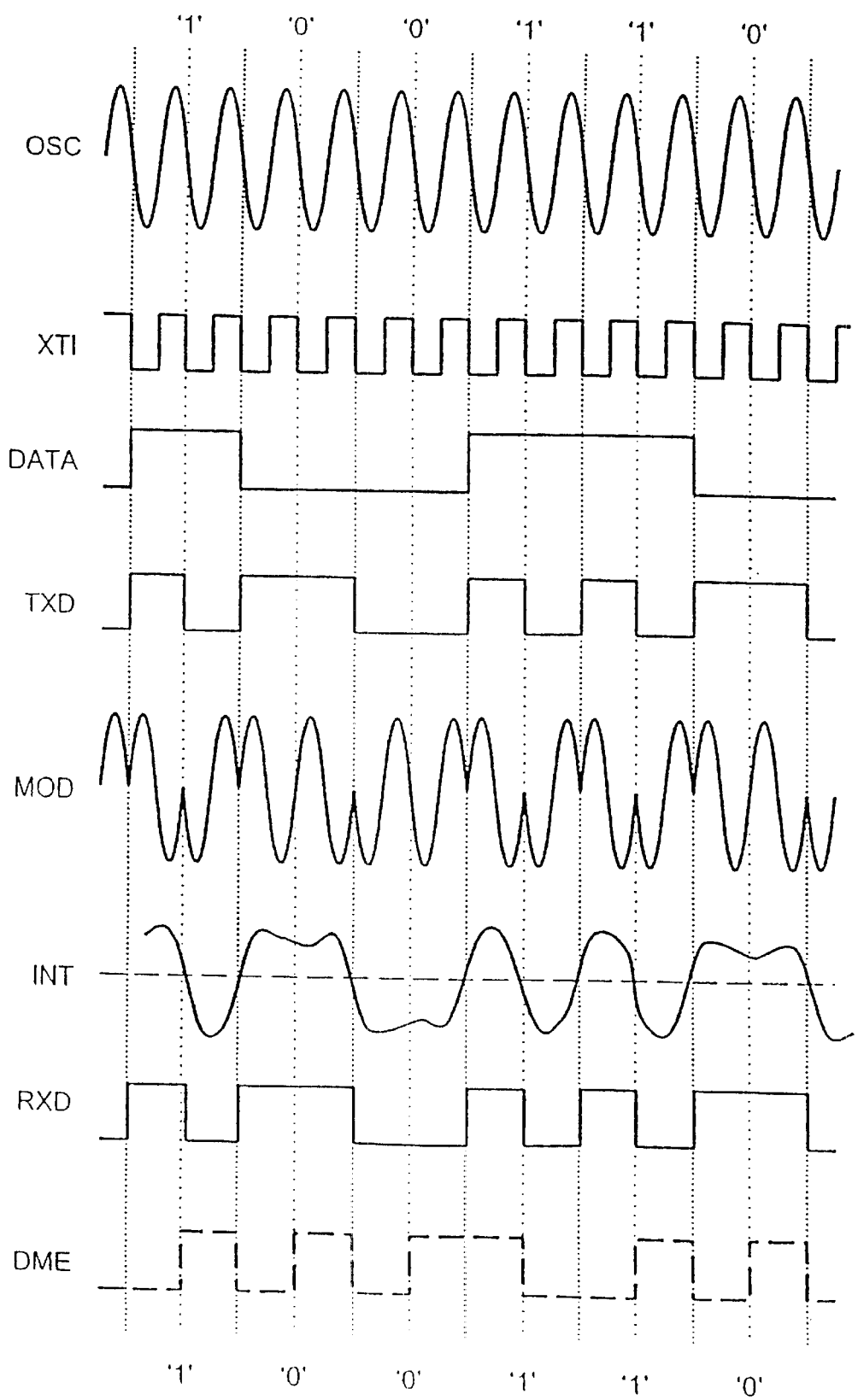
FIG. 4 shows various waveforms in the system of FIG. 3.

FIG. 4 shows the waveforms present at various stages in the encoding and decoding performed in embodiment of FIGS. 2 and 3. The sine wave signal OSC is shown at the top of the page, and has a frequency twice the data bit rate of the network. The square wave clock signal XTI having same frequency as the sine wave OSC is generated and supplied to the digital systems of the interface circuit 206, 206' and source/destination means 204, 204' within the master station. Data to be transmitted via the network is illustrated as waveform DATA, with six representative data periods having successive values 100110. As in the CONAN interface chip mentioned above, the actual data output as signal TXD is already subjected to channel coding, in this case so-called bi-phase encoding. This encoding ensures balance in the average DC value of the digital data TXD, and also provides for regular transitions helping in the recovery of the clock signal at the receiving side. In each bit period, a transition at the centre of the bit period indicates a "1" value, while no transition indicates a "0". A transition is always made at the start of each bit period, which ensures balance and aids clock recovery.

The PSK modulated signal MOD is shown next in FIG. 4. It can be seen clearly that this signal comprises succession of individual sine wave cycles, whose phase depends on the value of signal TXD. At each transition in signal TXD, the phase of the sine wave in signal MOD is reversed. A signal corresponding to the signal MOD is recovered at the decoding side, and integrated with a time constant similar to the period of the sine wave. The integrated waveform INT is shown in FIG. 4. Although the signal MOD has an average DC value of zero, it will be seen that, in the vicinity of each phase reversal, the local time average of the signal MOD will in fact deviate from zero for a short time. The integrated signal INT thus approximates the original digital waveform TXD, so that the received data signal RXD can be recovered which is a replica of TXD. Although, conventionally, a coherent detection is employed for PSK signals, or at least a delay circuit of one bit period, the present inventor has found that the signal can be recovered in a local area network by simple integration (low pass filtering) of the PSK waveform.

Details of the circuits on the encoding and decoding side will now be described, with reference to FIGS. 5 to 11. The circuits to be described can be implemented using discrete components, or as a single integrated circuit. Suitable component names and values will be given, by way of example only, for a discrete implementation using operational amplifier ("op-amp") integrated circuits and having a split-rail supply with VDD =+5 volts, VSS =−5 volts. For the sake of clarity, the diagrams omit to show decoupling capacitors which should be provided close to each IC package between its supply pins and ground (0 volts). It is assumed that the digital circuits of the network interface chip (206 in FIG. 2) operate with a single rail 5 volt supply, between VSS (−5 v) and ground (0 v). In an integrated circuit implementation, it is expected that the encoder and decoder would typically operate from a single rail supply, and employ differential mode circuitry to a greater extent, depending on the particular circuit technology.

Figure 5:
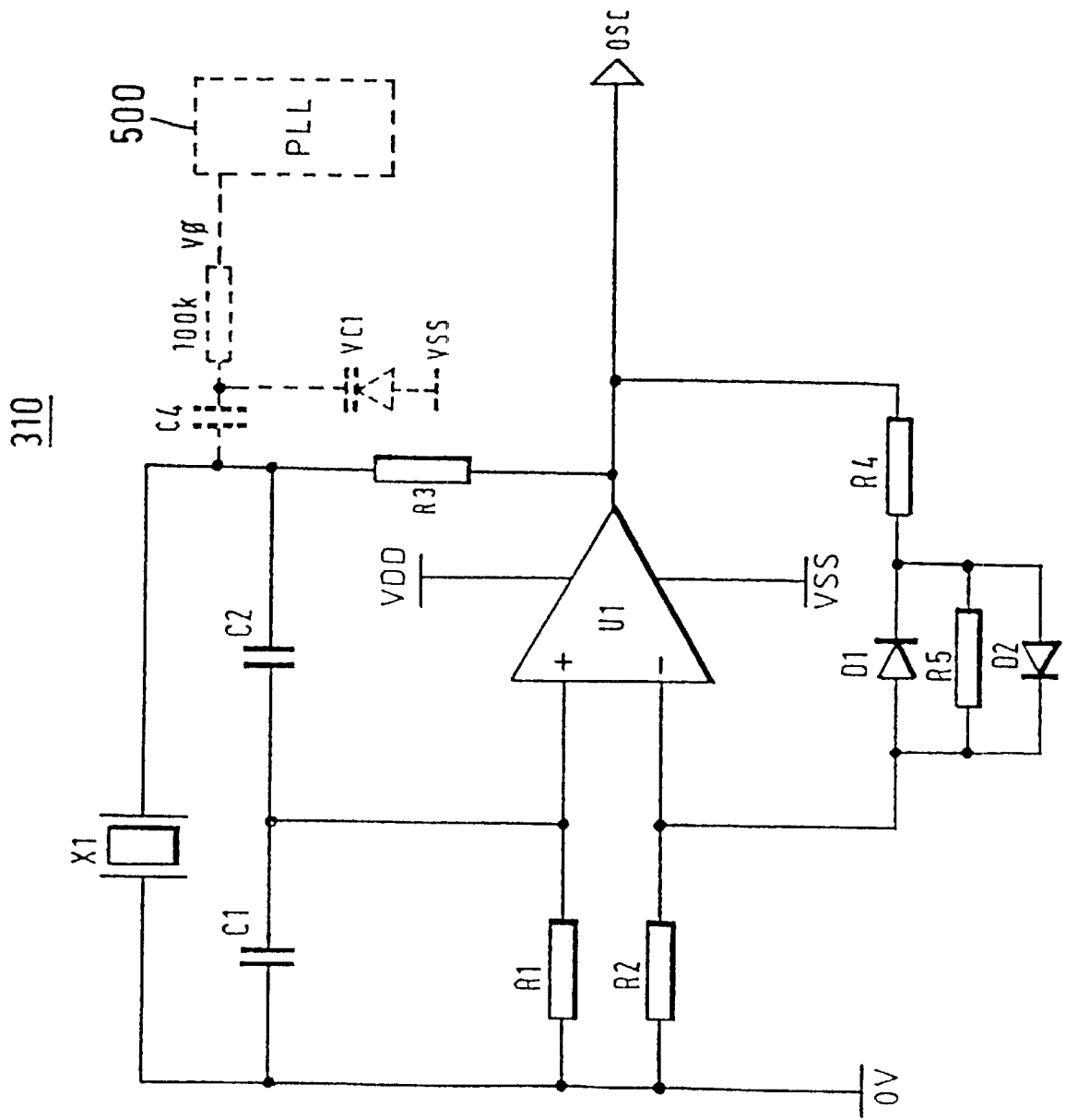
FIG. 5 shows in more detail a sine wave oscillator of the transmitter side in FIG. 3.

FIG. 5 shows the sine wave oscillator 310, which is centred around a Comlinear CLC428 op-amp U1 and an 11.286 MHz crystal X1 (208 in FIG. 2). The CLC428 is a fast current feedback op-amp with 300 MHz bandwidth, and contains two op-amps in each IC package. Two small value capacitors C1 and C2 form a resonant circuit with the crystal. Typical values are in the range of 20 to 30 picofarads (pF). Resistors R1 to R4 and the diode/resistor network D1, D2, R5 complete the oscillator circuit. R3 may be made adjustable to minimise distortion with an individual crystal. The diode/resistor network D1, D2, R5 provides some non-linearity in the feedback path to limit the gain and so avoid distortion of the sine wave due to saturation. The sine wave signal OSC with a period of 11.2896 MHz is taken from the output of operational amplifier U1.

Also shown in FIG. 5 (broken lines) is an optional arrangement for modulating the frequency and hence the phase of the signal OSC, in particular to synchronise it with the outgoing digital data when the encoder is part of a slave station in the network. This facility will be described later, with reference also to FIG. 11.

Figure 6:
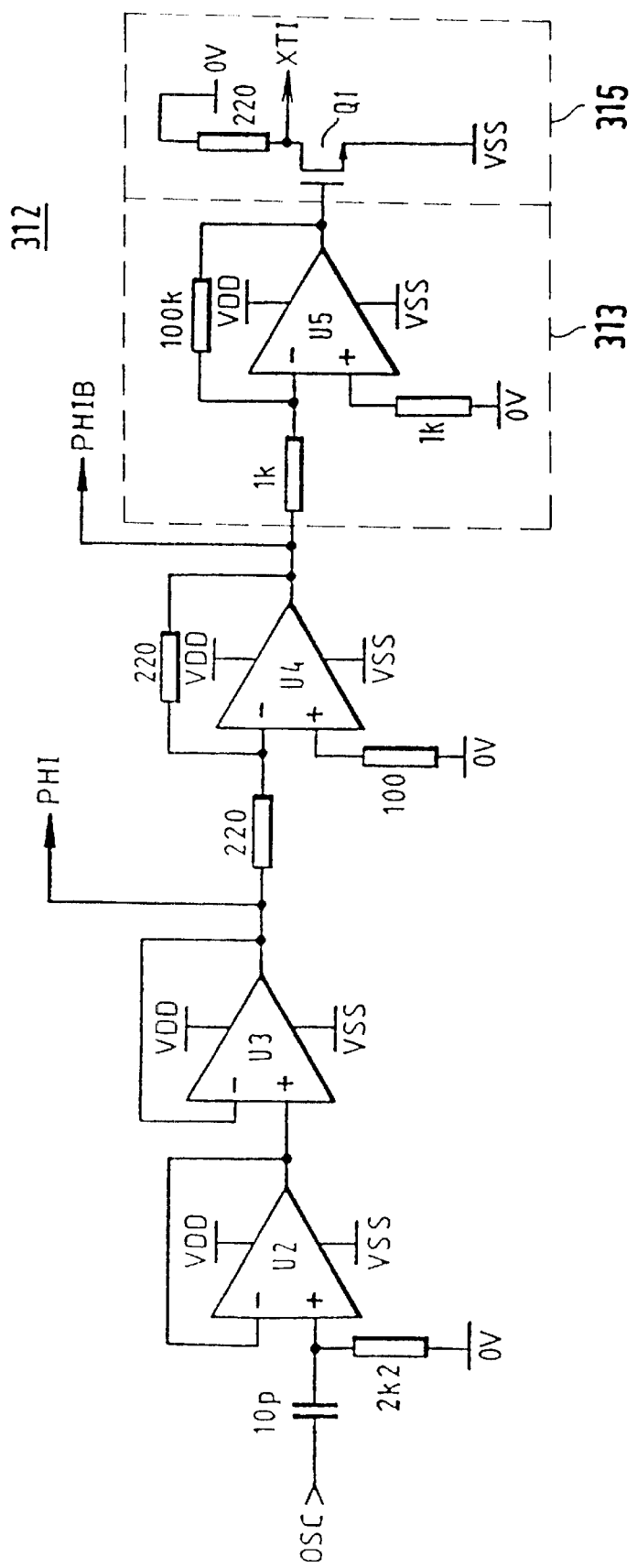
FIG. 6 shows in more detail a signal generator section on the transmitter side of FIG. 3.

FIG. 6 shows the signal generator 312 in more detail. This comprises four op-amps U2 to U5. U2 to U4 are of the same type CLC428, while U5 is of the low-cost type LM6181 (National Semiconductor). Resistor and capacitor values are shown in ohms and farads. The sine wave signal OSC is received and buffered with unity gain by amplifier U2. Amplifier U3 provides unity gain buffering, to generate the first phase component PHI for generating the modulated waveform. Amplifier U4 with associated resistor network provides a unity gain inverter, to generate the complementary phase signal PHIB. Finally amplifier U5 is arranged as a simple comparator 313 and buffer 315 to respectively derive and output a square wave in phase with the signal PHIB. An MOS transistor Q1 (for example Zilog type ZNV330) and a resistor provide a level shifting function, to generate the square wave clock signal XTI, for supply to the digital system. In the interface circuit 106, the basic clock signal is multiplied by appropriate factors to obtain internal clock signals for the digital circuitry of the interface circuit and the source/destination means 104.

Figure 7:
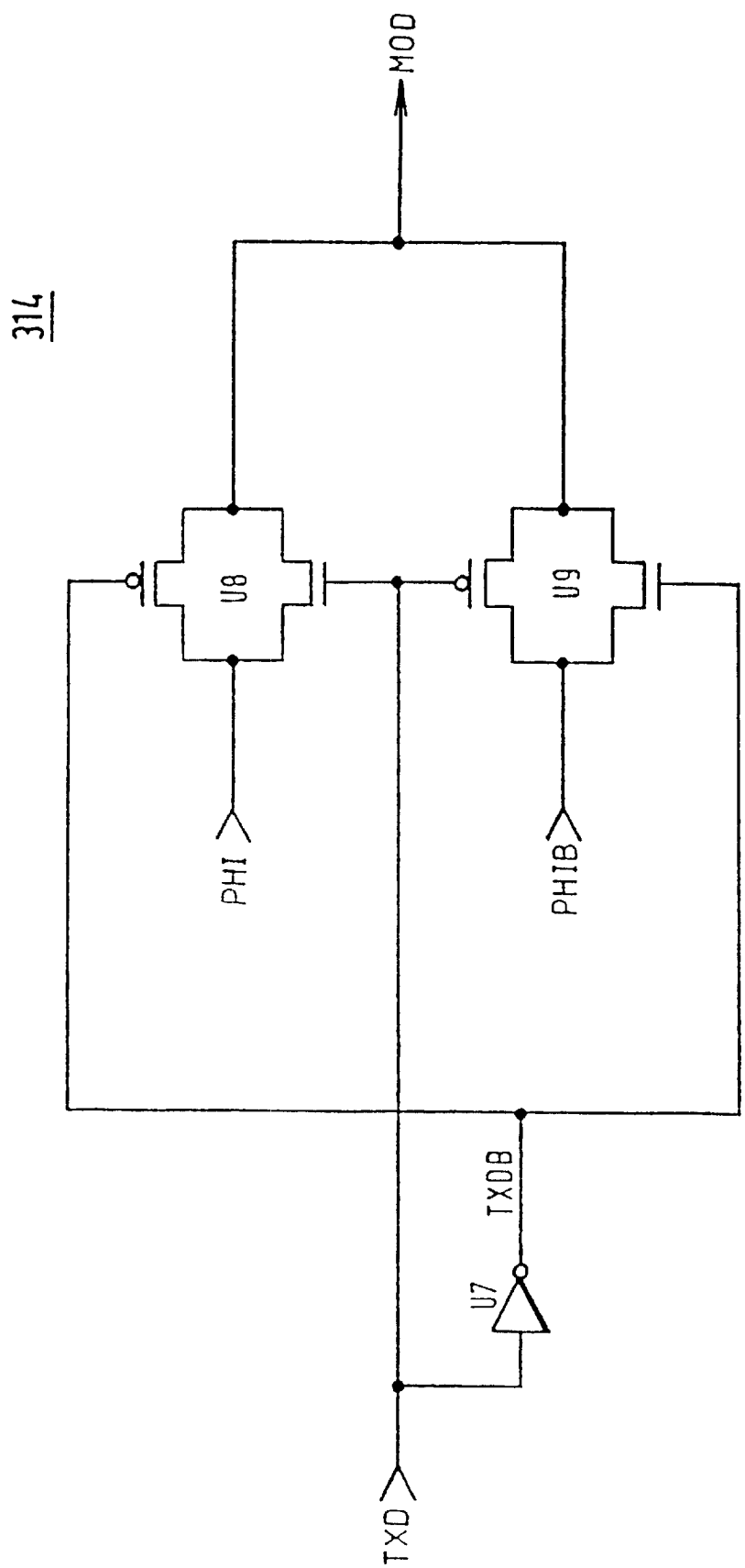
FIG. 7 shows in more detail a switching circuit on a transmitter side of FIG. 3.

FIG. 7 shows fast analog multiplexer or switching circuit 314 which comprises a CMOS inverter U7 and two CMOS transmission gates U8, U9. These components are available for example within a single IC package of type CD4007. The first phase component PHI is applied to the input of transmission gate U8, while the complementary or inverse signal PHIB is applied to the input of U9. The outputs of the transmission gates are connected together to provide the modulated signal MOD. The data signal TXD to be transmitted is received and a complementary digital signal TXDB is generated by inverter U7. The signals TXD and TXDB are applied to complementary control inputs of the transmission gates U8, U9 so that, when TXD is high, the first phase component PHI is switched through to form the output signal MOD. When TXD is low, the complementary phase component PHIB is switched through to form the modulated signal MOD.

Figure 8:
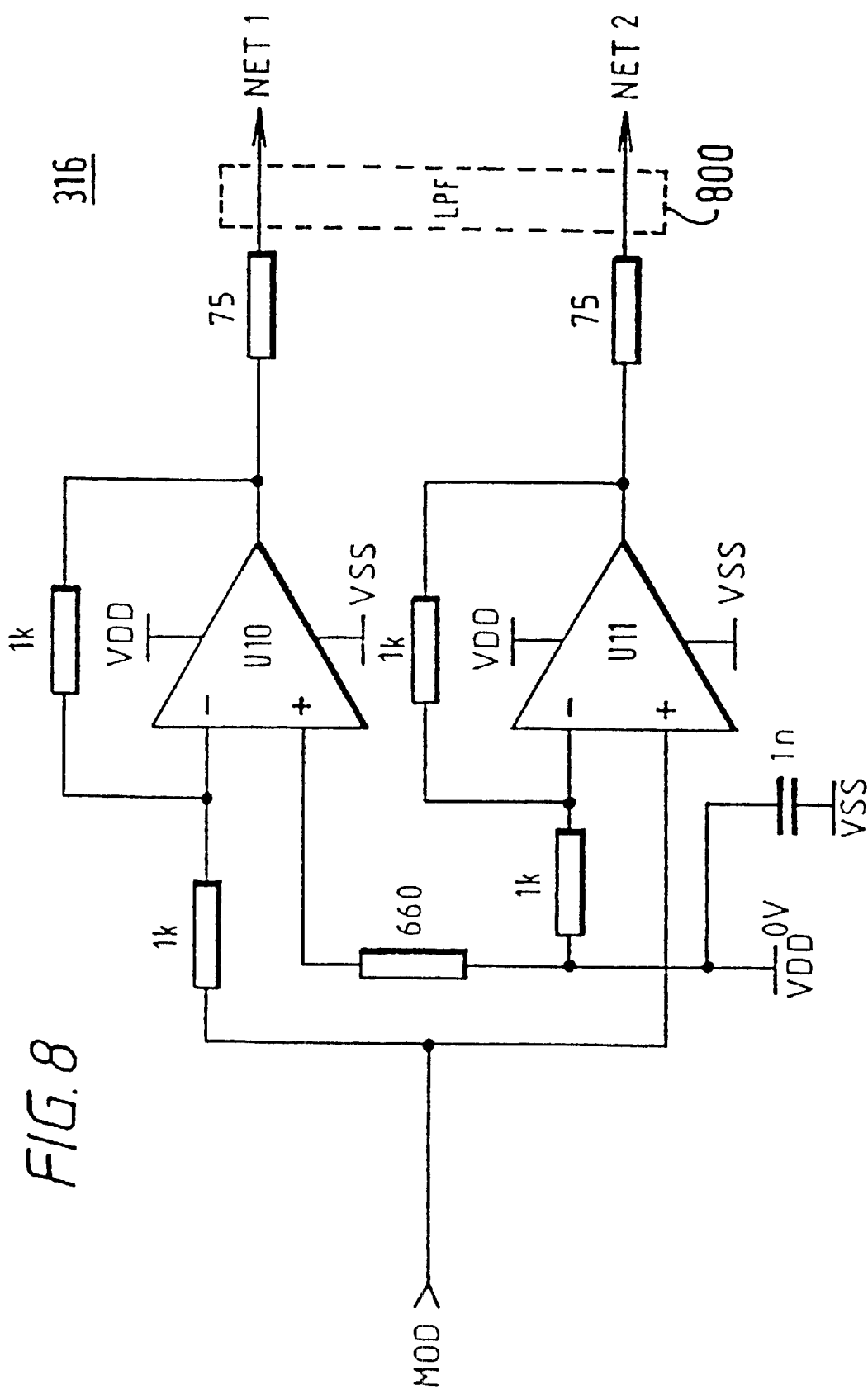
FIG. 8 shows in more detail a line driver section of the transmitter in FIG. 3.

FIG. 8 shows the differential line driver circuit 316, which receives the modulated signal MOD and generates balanced signals NET1 and NET2 for application to a 150 ohm twisted pair cable ($Z_0$=150 ohm). The line driver comprises a further two op-amps U10, U11 of CLC428 type, which may be found in a single IC package. Amplifier U10 is arranged with associated resistors to form a unity-gain inverter, and provides a signal NET1 through a 75 ohm resistor ($Z_0/2$). Amplifier U11 is arranged to form a unity-gain non-inverting amplifier, and provides the complementary output NET2, again through a 75 ohm resistor. Tests indicate at 11.2896 MHz an output amplitude of 1 volt can be generated without exceeding European EMC standards, even using a very low-cost twisted pair cable. However a filter 800 (shown dotted) may be provided if necessary at the output and/or input of line driver 316, as will be described below with reference to FIG. 10.

Figure 9:
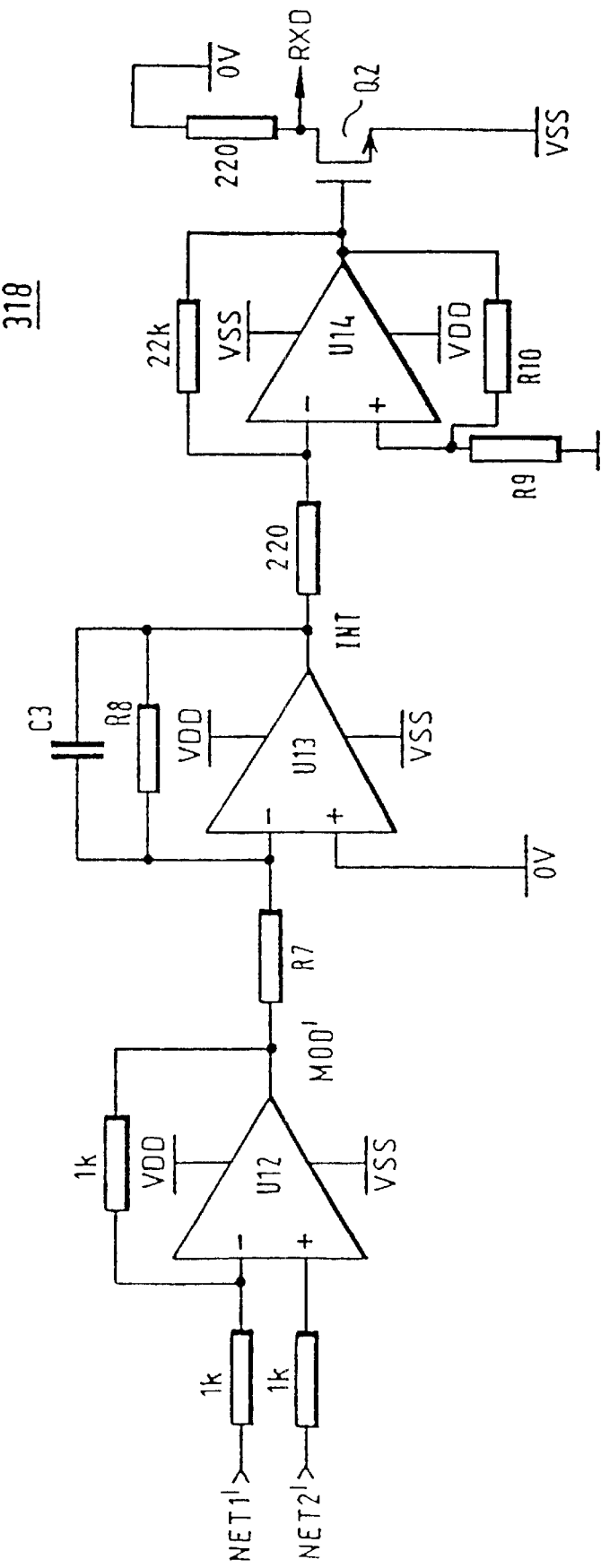
FIG. 9 shows in more detail a decoder section on the receiving side in FIG. 3.

FIG. 9 shows the decoder 318 which receives the signal NET1' and NET2' from the twisted pair cable. This comprises essentially three op-amps U12 to U14. Amplifier U12 is arranged to convert the balanced signal NET1'−NET2' to a single-ended signal MOD'. To this end, signal NET1 is applied (via a resistor) to the inverting input of amplifier U12, while the complementary signal NET2 is applied (via a resistor) to the inverting input. Amplifiers U12 and U13 are of the CLC428 type.

Amplifier U13 is arranged to perform the integrating function on the waveform MOD' to produce the waveform INT shown in FIG. 4. The signal INT is compared with 0 volts by a comparator based on amplifier U14 (LM6181 type) to obtain a binary signal, and transistor Q2 (ZVN330) provides a level shifting function, to generate the received data signal RXD.

Suitable values for components C3 and R7–R10 to obtain a strong signal can be related to the carrier frequency ω=2πf, which is approximately 71 Mrads$^{-1}$. A formula to determine suitable values is:

$$0.5(VDD - VSS)\frac{R9}{R9+R10} >> \left|\frac{VMOD}{\omega \cdot R7 \cdot C3}\right|$$

where VMOD is the amplitude of the waveform MOD'. Typical values for R9 and R10 with a bit rate of 5.6 Mbps might be 220 ohm and 1.8 kohm, respectively, with R7=1 kohm and C3=15 pF. Resistor R8 eliminates DC drift in the integrator, with a suitable value being derived for example such that:

$$R8.C3 >> T$$

where T is the data bit period (0.18 μs at 5.64 Mbps). Resistor R10 provides a degree of hysteresis in the comparator operation.

The utility of the present apparatus arises from the use of primarily analog circuitry to generate the PSK waveform. As mentioned in the introduction above, modem techniques for generating modulated waveforms of this type (PSK, FSK, MSK etc) have tended to rely on digital synthesis, using a look-up table to provide the sine wave segments in a digital form, which are then converted to analog waveforms. To generate a carrier sine wave at 10 MHz, typically a 60 MHz clock would be required in the synthesis circuit. Induced noise and quantisation noise in the generated waveforms leaves strong noise components at frequencies higher than the carrier frequency. These frequency components, even when filtered, inevitably cause interference in, for example, the FM radio band (87 to 108 MHz), making them unsuitable for use in audio systems with sensitive FM tuners. Filtering these components to leave only the sine wave frequency band is possible in theory, but the filter components are inevitably large, and the filtering imperfect. Such a high frequency digital circuit as part of the network interface also inevitably increases electromagnetic radiation generated by the equipment, which can interfere with other circuits (for example radio receivers), even if the modulated waveform flowing in the network cables is properly filtered. Tests with the present circuit indicate a noise amplitude in the FM band of less than +6 dBμv in the middle of the network ring.

For the above reasons, it is believed that the analog generation of PSK waveforms by switching of an analog generated sine wave provides a network usable more widely than prior art techniques. Ability to use a simple integrating circuit greatly reduces the cost and the size of the decoder. The use of cheap unshield twisted pair cable allows further economy, although shielded twisted pair or other cables may be used in ultra-low noise applications.

As a bonus, timing errors caused by thermal noise in photoelectric detectors are eliminated. It has been found that the photoelectric detector of the conventional fibre network (FIG. 1) can introduce jitter in the detection of the digital signal transmitted, which is believed to be due to thermal noise and the very high gain of the detector. A timing error of as much as ±1 nanosecond is believed to be typical and this can cause inaccuracy in the timing of reproduced audio signals. The PSK modulation and detection of the present system averages out the jitter. partly because of lower gain in the detection of the transitions.

The frequency of the sine wave carrier signal OSC is chosen to be twice the data bit rate, in view of the bi-phase encoding. The frequency of the sine wave carrier signal OSC may exceed, for example 5 MHz or 10 MHz. For the CONAN interface circuit two sub-frames are transmitted in every audio sample period. Each sub-frame comprises 64 bits, and therefore the typical audio sampling frequency of 44.1 kHz requires a bit rate of approximately 5.6 MHz. Since the carrier frequency of the PSK modulation of the network is closely related to the channel bit period, the oscillator frequency of 11.2896 MHz will need to be changed for different sampling periods and/or different frame structures. In other embodiments (based on ARCNET, for example) the network clock need not be synchronised with the audio data clock of the source (destination means), since the network timing and audio sample timing would be independent.

Various other modifications of the embodiment described are possible within the scope of the invention, as will be apparent to the skilled reader. Some particular changes are mentioned below.

In the embodiment described, the carrier frequency chosen ensures an integral number of cycles between phase reversals, either one cycle or two, depending on whether there is a transition in the middle of a bit period or not. If desired, two or more cycles could in principle be allowed as the minimum between transitions, but the decoding by the simple integrating decoder will become less reliable, and more complex delay-based or fully coherent decoder circuits would be preferred. Similarly, with more elaborate detection, the minimum between transitions could be made less than one cycle (for example, one half cycle), to increase the data rate.

It should also be noted that the carrier sine wave does not need to be fixedly synchronised with the data clock, provided the carrier and data frequencies are very closely matched and stable over at least two periods. The use of crystals as frequency references easily ensures these criteria. The slave station encoder can therefore use its own 11.2896 MHz crystal (208' in FIG. 2) and sine wave oscillator to transmit a PSK signal onward to the next slave station. Alternatively, however, means can be provided in the slave station encoder for locking the sine oscillator to the clock recovered from the received data signal; as illustrated by a dotted arrow CLK in FIG. 2 and described below with reference to FIG. 11. This would allow transitions in the slave data output TXD to be synchronised with zero crossings of the sine wave, as shown in FIG. 4, further reducing noise at the point of switching.

Figure 10:
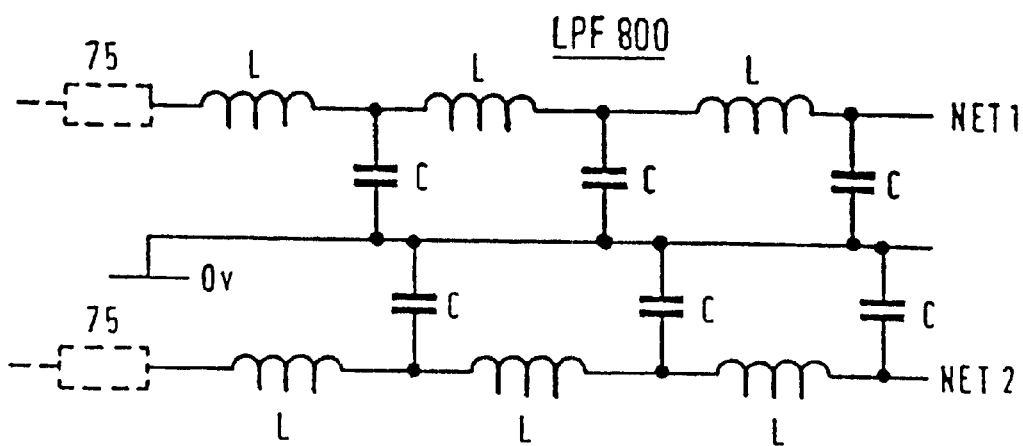
FIG. 10 shows an optional low pass filter circuit for suppressing noise.

FIG. 10 shows a low pass filter circuit 800 that can be readily implemented using small surface mount components at the output of the line driver 318 (FIG. 8). The example shows a three-pole LC filter with a cutoff frequency around 16 MHz. Suitable values for the inductors and capacitors C are 10 μH and 20 pF respectively. The filter could alternatively be wholly or partly interposed before line driver 316. Although the filter 800 was used in the above-mentioned tests, it is believed that even the low noise level detected was due to common mode noise induced in the ground plane, rather than differential signal itself. Accordingly, the filter may well be unnecessary. In any case, by avoiding the generation of quantisation noise at a higher frequency than the carrier frequency, the proposed encoder will require less filtering at all stages than an encoder based on digital synthesis.

As mentioned above, it may be preferable to ensure that transitions in the digital signal TXD to be transmitted should be synchronised with zero-crossings of the sine wave signal carrier signals PHI and PHIB in the slave stations, as well as the master. Shown dotted in FIG. 5 is a modification of the oscillator circuit in which a varactor diode VC1 provides a variable capacitance to vary slightly the frequency (and thus the phase) of the oscillator output OSC. A control voltage Vφ is applied to varactor VC1 by a simple phased locked loop (PLL) arrangement 500. A capacitor C4 (20 pF approximately) prevents the DC control voltage reaching the oscillator's components.

Figure 11:
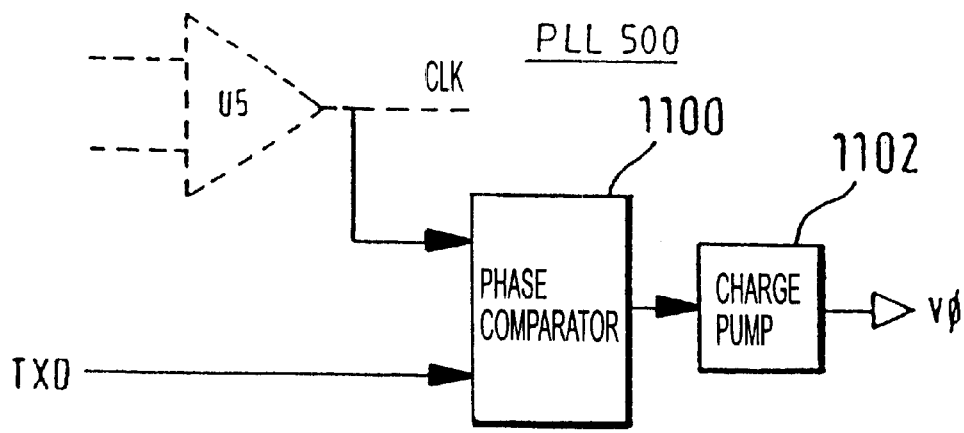
FIG. 11 shows an optical phase locked loop arrangement for controlling the phase of the oscillator on slave stations of the network.

FIG. 11 shows schematically the arrangement of the PLL 500. A digital phase comparator circuit 1100 compares the phase of the carrier (represented by the output of comparator 115, FIG. 6) with that of the transmission bitstream TXD. A charge pump 1102 generates the control voltage Vφ from the output of phase comparator 1100, to control the phase of the oscillator. Since the phase of the transmit data TXD is derived by the network interface from the received data RXD, the carrier waves throughout the network thus become synchronised. At each station, the transitions in the digital waveform TXD are synchronised with zero-crossings of the carrier components PHI and PHIB.

In the application described, the Conan chip OCC8001 includes circuity to detect and correct inversion of the digital signal TXD. In other embodiments, however, the polarity of the modulated signal may be important, to ensure that the received data signal RXD has the same polarity as the transmitted data TXD. This is not so much of a problem in the optical network, since the presence of light or no light can easily be distinguished without ambiguity. In a twisted-pair medium, however, it is advantageous if wiring harnesses and connections can be made without regard to which conductor of the pair is which. As shown at the foot of FIG. 4, therefore, alternative channel encoding techniques can be employed, such as a differential Manchester encoding (waveform DME in FIG. 4). In contrast to the bi-phase encoding of the known CONAN network, the DME waveform is defined as follows: (a) there is always a transition at the centre of each bit period; and (b) there is a transition at the start of the bit period if the data bit is 0, but not if the data bit is a 1.

The transition at the centre of each bit period allows easy clock recovery. It is a property of the differential Manchester encoding that the original bit stream (DATA in FIG. 4) can be recovered without risk of inversion, irrespective of whether the channel bit stream (DME in FIG. 4) is inverted or not. Frame synchronisation, in the bi-phase channel encoding or the DME version, is provided by inserting special patterns which violate the normal coding rules.

Although the embodiments described in detail employ only binary phase shift keying (two carrier signals in antiphase), the skilled reader will readily appreciate that encoders and decoders with more carrier phases can be implemented by similar techniques. These can increase the effective data rate, although circuit complexity and susceptibility to noise will generally be higher than for the binary case mentioned above.

As one example, four carrier phases separated by 90 degrees each can be used to generate quadrature or QPSK waveforms, carrying two bits per symbol period. A QPSK embodiment can be implemented by using two BPSK encoders and two BPSK decoders with additional circuitry. Separate clock signals for the two encoders are generated in quadrature, and the encoder outputs summed for transmission. A 90-degree phase splitter at the receiving side can be used to recover effectively the two BPSK waveforms, which are then fed to the respective BPSK decoders. Other encoding methods and physical implementations are equally possible.

What is claimed is:

1. A local communication system for transmitting a digital serial data signal of at least 1.4 Mbps gross data rate, the system comprising a first station including an encoder and a second station including a decoder connected to the encoder of the first station by electrical conductors, the encoder of the first station comprising:

carrier signal generating means for generating a carrier signal at a carrier frequency without using digital synthesis;

a phase shift keying (PSK) modulation circuit responsive to said digital serial data signal for selectively outputting one of (a) said carrier signal and (b) its inverse, dependent on the value of said digital serial data signal so as to generate a PSK waveform; and driver means for imposing said PSK waveform on said conductors, the decoder of the second station being a decoder for decoding said PSK waveform so as to recover the digital serial data signal.

2. A system as in claim 1 wherein said carrier frequency is related to the data rate of said serial data signal such that substantially an integral number of cycles of the carrier signal occur between transitions of the serial data signal.

3. A system as in claim 2 wherein said integral number takes the value one or two, depending on the data content of the serial data signal, and disregarding any special synchronisation patterns present in the serial data signal.

4. A system as in claim 1 wherein said carrier signal generating means is arranged to generate two sine wave signals in antiphase with one another and said PSK modulation circuit comprises a switching circuit responsive to said digital serial data signal for selectively outputting one of said sine wave signals, dependent on the value of said digital serial data signal.

5. A system as in claim 1 wherein said serial data signal is channel encoded so as to comprise either one or two transitions per data bit.

6. A system as in claim 1 wherein said serial data signal is channel encoded in differential form such that the recovered serial data signal is independent of inversion of the PSK waveform.

7. A system as in claim 1 wherein said carrier frequency is twice the gross data bit rate of said serial data signal.

8. A system as in claim 1 wherein said carrier frequency exceeds 5 MHz.

9. A system as in claim 1 wherein said carrier frequency exceeds 10 MHz.

10. A system as in claim 1 wherein said electrical conductors comprise a twisted pair cable, said driver means comprises a differential line driver, and said decoder includes a differential input circuit for rejection of common mode noise.

11. A system as in claim 1 wherein the encoder further comprises means for fixedly synchronising said carrier signal with said digital serial data signal.

12. A system as in claim 11 wherein transitions of said digital serial data signal are synchronised with zero crossing of said carrier signal.

13. A system as in claim 11 wherein said synchronising means comprises means for deriving a digital data clock signal from a sine wave signal within said carrier signal generating means, and for supplying said clock signal to a digital circuit so as to control release of said serial data signal.

14. A system as in claim 1 wherein said second receiving station further comprises means for recovering from said PSK waveform or from the decoded serial data signal a data clock signal for use in processing the recovered serial data signal.

15. A system as in claim 1 wherein one of said first and second stations includes an FM radio receiver.

16. A system as in claim 1 wherein one of said first and second stations includes a mobile telephone component.

17. A system as in claim 1 wherein said serial data signal includes digital audio data and said serial data signal is generated synchronously with the sampling periods of said audio data.

18. A system as in claim 1 wherein said second station further comprises:
   digital circuit means for processing said recovered serial data signal and generating a second digital serial data signal; and
   a second encoder for transmitting said second serial data signal over further conductors, said second encoder including second carrier signal generating means, a second PSK modulation circuit and second driver means equivalent to the encoder of the first station.

19. A system as in claim 18 wherein said digital circuit means comprises:
   a digital network transceiver circuit integrated separately from said second encoder;
   the digital circuit means comprising means for extracting a signal from the recovered serial data signal,
   whereby the second serial data signal is synchronised with said serial data signal.

20. A system as in claim 19 wherein said second carrier signal generating means is arranged to generate a generated carrier signal fixedly synchronised with said second serial data signal.

21. A system as in claim 20 wherein said second carrier signal generating means comprises a phase comparator for comparing the phase of the generated carrier signal with that of said second digital serial data signal and for controlling the frequency of the generated carrier signal in response to an output of the phase comparator.

22. A system as in claim 21 wherein said second carrier signal generating means generates plural sine wave signals.

23. A system as in claim 20, comprising a ring network of at least said first and second stations, each of the first and second stations comprising an encoder and decoder connected by conductors for communication with the decoder and encoder of next and previous stations of said ring network respectively.

24. A system as in claim 23 wherein:
   each station includes synchronising means comprising means for deriving a digital data clock from a sine wave signal within said carrier signal generating means, and for supplying said digital data clock to digital circuit means so as to control release of said serial data signal,
   each said carrier signal generating means comprises a phase comparator for comparing the phase of each thereat generated sine wave signal with that of the thereat recovered serial data signal and for controlling the frequency of the thereat generated sine wave signal in response to an output of the phase comparator; and
   said synchronising means are used selectively, depending on whether the station is acting as a network master or network slave, respectively.

25. An apparatus for reception of digital serial data having all the second station technical features of a system as in claim 18.

26. A system as in claim 1 wherein said decoder is a non-coherent decoder, comprising an intergrator circuit for intergrating said PSK waveform to recover said serial data signal.

27. An encoder for transmission of a digital serial data signal at a gross data rate of at least 1.4 Mbps, the encoder comprising:
   carrier signal generating means for generating a carrier signal at a carrier frequency without using digital synthesis;
   a phase shift keying (PSK) modulation circuit responsive to said digital serial data signal for selectively outputting one of (a) said carrier signal and (b) its inverse, dependent on the value of said digital serial data signal so as to generate a PSK waveform; and
   driver means for imposing said PSK waveform on electrical conductors.

28. An adapter device for connecting a first digital data processing circuit to a second digital data processing circuit via a wired communications link, the adapter comprising a self-contained unit including:
   analogue signal generating means for generating plural sine wave signals at a carrier frequency, the signals having predetermined different phases relative to one another;
   clock generating means connected with said analogue signal generating means for generating at least one digital clock signal synchronised with at least one of said sine wave signals for application to said first digital data processing circuit;
   switching means connected for receiving from said first digital data processing circuit a first digital serial data signal and for generating a first phase shift keying (PSK) modulated signal in accordance with the received first digital serial data signal by switching between different ones of said plural sine wave signals in response to transitions of said first digital serial data signal.

29. An adapter device as in claim 28 further comprising a differential line driver for applying said modulated signal to a pair of conductors forming said wired communication link.

30. An adapter device as in claim 28 further comprising means for receiving a second PSK modulated signal from an equivalent adapter device coupled to the second digital data processing circuit, and means for recovering therefrom a second digital serial data signal for supplying to said first digital data processing circuit.

31. An adapter device as in claim 30 wherein said analogue signal generating means includes means for synchronising said plural sine wave signals and said digital clock signal with received second modulated signal.

32. An adapter device as in claim 28 wherein said analogue signal generating means includes an analogue oscillator circuit for generating a sine wave signal at carrier frequency.

33. An adapter for connecting a first digital data processing circuit to a second digital data processing circuit via a wired communications link, the adapter comprising a self-contained unit including:

carrier signal generating means for generating a carrier signal at a carrier frequency;

clock generating means connected with said carrier signal generating means for generating at least one digital clock signal synchronised with said carrier signal for application to said digital data processing circuit;

phase shift keying (PSK) modulation means for receiving from said first digital data processing circuit a first digital serial data signal and for generating a first PSK modulated signal in accordance with the received first digital serial data signal by selectively outputting one of (a) said carrier signal and (b) its inverse, dependent on the value of said first digital serial data signal.

34. An adapter device as in claim 33 further comprising a differential line driver for applying said modulated signal to a pair of conductors forming said wired communications link.

35. An adapter device as in claim 33 further comprising means for receiving a second PSK modulated signal from an equivalent adapter device coupled to the second digital data processing circuit, and means for recovering therefrom a second digital serial data signal for supplying to said first digital data processing circuit.

\* \* \* \* \*